United States Patent [19]

Antrim et al.

[11] Patent Number: 4,963,385
[45] Date of Patent: Oct. 16, 1990

[54] STABILIZED EMULSIONS CONTAINING HIGHLY UNSATURATED OILS

[75] Inventors: Richard L. Antrim; James B. Taylor, both of Sparta, N.J.

[73] Assignee: Nabisco Brands, Inc., East Hanover, N.J.

[21] Appl. No.: 360,631

[22] Filed: Jun. 2, 1989

[51] Int. Cl.$^5$ .......................... A23D 7/00; A23C 15/00
[52] U.S. Cl. .................................. 426/602; 426/271; 426/541; 426/544; 426/545; 426/546; 426/581; 426/603; 426/605
[58] Field of Search ............... 426/271, 541, 544, 545, 426/546, 581, 602, 603, 605, 330.6

[56] References Cited

U.S. PATENT DOCUMENTS

| | | | |
|---|---|---|---|
| 253,983 | 2/1882 | Corwin | 426/581 |
| 2,198,208 | 4/1940 | Musher | 426/546 |
| 2,198,212 | 4/1940 | Musher | 426/546 |
| 2,198,213 | 4/1940 | Musher | 426/546 |
| 2,282,800 | 5/1942 | Musher | 426/541 |
| 2,290,064 | 4/1942 | Musher | 426/544 |
| 3,249,442 | 5/1966 | Keyes et al. | |
| 3,429,716 | 2/1969 | Andrews | 426/546 |
| 3,920,521 | 11/1975 | Michelson et al. | |
| 3,997,402 | 12/1976 | Michelson | |
| 4,029,819 | 6/1977 | Michelson | |
| 4,049,831 | 9/1977 | Ono et al. | 426/74 |
| 4,211,865 | 7/1980 | Ferruti et al. | 536/48 |
| 4,461,777 | 7/1984 | Murase et al. | 426/330.6 |
| 4,497,710 | 2/1985 | Wagu et al. | 210/635 |
| 4,525,306 | 6/1985 | Yajima | 260/428.5 |
| 4,554,107 | 11/1985 | Takao | 260/421 |
| 4,615,839 | 10/1986 | Seto et al. | 260/412 |
| 4,623,488 | 11/1986 | Takao | 260/412 |
| 4,764,392 | 8/1988 | Yasufuku et al. | 426/603 |
| 4,828,855 | 5/1989 | Sasaki et al. | 426/603 |

FOREIGN PATENT DOCUMENTS

| | | |
|---|---|---|
| 89102223 | 3/1989 | PCT Int'l Appl. |
| 2033745 | 5/1980 | United Kingdom |
| 1604554 | 12/1981 | United Kingdom |
| 8902223 | 3/1989 | World Int. Prop. O. |
| 8906906 | 8/1989 | World Int. Prop. O. |

OTHER PUBLICATIONS

Inhibition of Lipid Oxidation in Fatty Fish by Glucose Oxidase Preservation, Ph.D. dissertion by Yi-Hua Lin, Univ. R. I.; 1987 publication date.

Boulti Fish Paste 1, Preparation and Chemical Composition, A. A. Ibrahim et al., Z. Ernahrungswiss, 19, pp. 159–162 (1980).

Application of Cyclodextrin, K. Hara et al., J. Jpn. Soc. Starch Sci., 33, 2, pp. 152–161 (1986).

*Primary Examiner*—Donald E. Czaja
*Assistant Examiner*—Evan Federman

[57] ABSTRACT

Food emulsions containing highly unsaturated fatty acids or derivatives thereof are stabilized against oxidative attack upon the unsaturated components by using a stabilizer system in the water phase of the emulsion which comprises either a sugar or sugar alcohol or a sugar or sugar alcohol and a metal-ion chelator.

12 Claims, No Drawings

STABILIZED EMULSIONS CONTAINING HIGHLY UNSATURATED OILS

BACKGROUND OF THE INVENTION

The present invention relates to oil-in-water or water-in-oil emulsions which contain significant amounts of oil in the form of highly unsaturated fatty acids and derivatives thereof which are stabilized against oxidative attack upon the unsaturated oils. These highly unsaturated compounds have at least three to six double bonds and would include all of the cis forms of 5, 8, 11, 14, 17-eicosapentaenoic acid (EPA), which contains five of such double bonds, and all of the cis forms of 4, 7, 10, 13, 16, 19-docosahexaenoic acid (DHA), which contains six of such double bonds, and all of the food, drug and cosmetic grade derivatives thereof. The CAS Registry No. of EPA is 10417-94-4, and the CAS Registry No. of DHA is 6217-54-5. The stabilization is accomplished by the use of carbohydrate with or without ethylenediaminetetraacetic acid compositions as disclosed hereinafter.

DESCRIPTION OF THE PRIOR ART

For health reasons, it is desirable to replace some or all of the saturated or slightly unsaturated oils that have been used heretofore in ingestible or topically applied emulsions with highly unsaturated oils such as fish oil which contains the fatty acid moieties EPA and DHA.

EPA and DHA are usually derived in the form of neutral triglycerides, glycolipids, phospholipids, etc., from marine fats, algae and fungi. They are used in the form of various food grade derivatives thereof. Because of their highly unsaturated structures, these compounds are very prone to oxidation due to conjugated double bonds and when oxidized may have a highly unpleasant and rancid odor.

Although various attempts have been made by those in the art to place various of these compounds in a condition or system that would stabilize them against oxidation and render the compounds more organoleptically acceptable during and after ingestion, when the compounds are used in emulsion form, none have been entirely successful in providing a means to accomplish both ends successfully.

U.S. Pat. Nos. 4,211,865, 4,497,710 and 4,615,839 disclose the preparation of EPA and/or DHA and/or some derivatives thereof.

U.S. Pat. Nos. 4,525,306, 4,554,107, 4,623,488; UK 1,604,554 and UK 2,033,745 disclose the use of certain antioxidants with EPA and/or DHA, or fish oils containing EPA.

In a Ph.D. University of Rhode Island dissertation by Yi-Hua Lin, published in 1987, by UNI Dissertation Information Service, 300 N. Zeib Road, Ann Harbor, Michigan 48106, entitled "Inhibition Of Lipid Oxidation In Fatty Fish By Glucose Oxidase Preservation," the use of a glucose oxidase/catalase/glucose enzyme system alone, and with an invertase/glucose oxidase/catalase/sucrose system, was used to inhibit lipid oxidation in fresh mackeral.

The dissertation also investigated the effects of catalase, glucose oxidase and hemoglobin on lipid oxidation in a model system.

U.S. Pat. Nos. 3,920,521, 3,997,402 and 4,029,819 disclose the use of superoxide dismutases as antioxidants in foodstuffs containing, inter alia, lipids.

In U.S. patent application Ser. No. 162,629 filed Apr. 18, 1988, entitled "Stabilized Highly Unsaturated Fatty Acids And Derivatives Of Such Acids," there is disclosed a means for stabilizing highly unsaturated acids such as EPA and DHA, and derivatives thereof, by microencapsulating these compounds with water activated oxidoreductase enzymes.

OBJECTS OF THE PRESENT INVENTION

An object of the present invention is to provide EPA and DHA and similar highly unsaturated materials, and food and cosmetic grade derivatives thereof, with a stabilizing system that will enable such materials to be rendered stable against oxidative attack, for prolonged periods of time when used in emulsified and unencapsulated form in food, drug and cosmetic products.

DESCRIPTION OF THE PREFERRED EMBODIMENT

The Unsaturated Compounds

The unsaturated compounds to be used in the present invention, as noted above, are fish oils and food grade derivatives of EPA and DHA. These compounds may be used individually, or in various combinations thereof, in the present invention. By "food grade derivatives," it is meant those derivatives of EPA and DHA that are acceptable for use in food and pharmaceutical applications.

The food grade derivatives of EPA and DHA would include mono-, di-, and triglycerides, phospholipids, phosphate lipids, glyco lipids and salts. The salts would include the Na, K and $NH_4$ salts. Other useful derivatives would include amides and esters (i.e., esters of U.S. Pat. No. 4,211,865). A preferred source of the EPA and DHA would be naturally occurring fish oil materials. These fish oils contain about 15 to 30 weight % of the EPA and DHA and derivatives thereof. For use in the emulsions of the present invention, the unsaturated materials should have a melting point of no higher than about 100° F., and preferably no higher than about 86° F.

The term "fat" refers to a triglyceride composition characterized by a solid or plastic consistency at ambient temperatures, e.g. at about 70° F.

The term "oil" refers to a triglyceride composition characterized by a fluid or liquid consistency at ambient temperatures, e.g. at about 70° F.

The Emulsions

The emulsions which are the subject of the present invention are water-in-oil or oil-in-water type emulsions which are formulated with food, drug or cosmetic grade components for, respectively, food, drug or cosmetic purposes. In formulating these products according to the present invention, some or all of the oils previously used by those in the art of formulating such products are replaced by one or more of the highly unsaturated oils of the present invention.

If the highly unsaturated material is a solid at ambient temperatures (i.e. ≦25° C.), it may be heated to liquefy it prior to its use in forming the desired emulsions.

The food type emulsions of the present invention would include oil-in-water type emulsions such as mayonnaise, salad dressing and spreads and water-in-oil type emulsions such as margarine, margarine containing real butter, buttery margarine, and high-water spreads (water >20% of emulsion). The term "buttery margarine" means a margarine product made with at least 80% non-butter fat, and which has added thereto enough artificial or natural butter flavor to impart a discernible butter flavor taste thereto.

The term "margarine spread" is used to delineate a water-in-oil spread from an oil-in-water oil spread.

The emulsions of the present invention may be made using technology commonly in use for such purposes, with the exception that the unsaturated compounds of the present invention are blended into the oil phase of such products, prior to the emulsification process, and the stabilization system of the present invention is blended into the water phase of such products, prior to the emulsification process.

The most preferred emulsions of the present invention are those margarine spreads that have an oil phase content of about 60 to 80 weight % and a milk or aqueous phase content of about 40 to 20 weight %. These spreads would have the following composition:

|  | Weight % Of The Total Composition | |
|---|---|---|
|  | Broad Range | Preferred Range |
| Oil Phase Component |  |  |
| liquid non-hydrogenated vegetable oil | 5 to 60 | 20 to 50 |
| partially hydrogenated vegetable oil | 5 to 35 | 10 to 30 |
| Lecithin | 0.05 to 0.5 | 0.1 to 0.3 |
| mono- and diglycercides | 0.05 to 0.5 | 0.1 to 0.3 |
| flavor and/or colorant | 0.001 to 0.02 | 0.008 to 0.012 |
| fish oil | 1 to 40 | 5 to 20 |
| Water or Milk Phase Component |  |  |
| water or aqueous solution at pH of 3 to 9 preferred pH (5 to 7) | 10 to 45 | 20 to 35 |
| whey | 0.1 to 3 | 0.5 to 1.5 |
| salt | 0.1 to 4 | 1 to 3 |
| Na benzoate | 0.01 to 0.2 | 0.05 to 0.15 |
| K sorbate | 0.01 to 0.2 | 0.05 to 0.15 |
|  | 100 | 100 |

The vegetable oils to be used would include corn oil, soybean oil, sunflower oil and cotton seed oil.

The emulsifiers would include lecithin, monoglycerides and diglycerides.

The Stabilizer Composition

The highly unsaturated materials of the present invention are stabilized against oxidation when they are in the oil phase of the products of the present invention by adding to the water phase of such products, prior to the manufacture of such products, a stabilizer composition. The stabilizer composition comprises, in parts by weight (pbw), per 100 parts by weight of the water phase in which it is used.

about 1 to 30 and preferably about 10 to 20 pbw sugar or sugar alcohol and/or about 0.0005 to 0.01 and preferably about 0.001 to 0.008 pbw metal chelating agents.

The sugars may be monosaccharides such as glucose, fructose and xylose, or disaccarides such as maltose, sucrose, trehalose and lactose, or trisaccharides such as matotriose and raffinose. The sugar alcohols that may be used in this invention include mannitol, sorbitol and xylitol.

The water phase has a pH of about 2 to 9, and preferably of about 5 to 7. The desired pH may be obtained by the use of water soluble buffering agents such as sodium phosphate.

The metal chelating agents would include one or more of ethylenediaminetetraacetic acid (EDTA), as such, or in the form of salts thereof, such as the tetra sodium salt and the disodium-monocalcium salt, sodium phosphate, citrate, and glycine.

Further examples of chelating agents contemplated by the present invention, include, for example,

| (Acetic acid) | Na-, K-, Ca-salts |
|---|---|
| Citric acid | Na-, K-, Ca-salts monoisopropyl ester monoglyceride ester triethyl ester monostearyl easter |
| EDTA | Na-, Ca-salts |
| (Gluconic acid) | Na-, Ca-salts |
| Oxystearin |  |
| Orthophosphoric acid | Na-, K-, Ca-salts |
| (Pyrophosphoric acid) | Na-salt |
| (Triphosphoric acid) | Na-salt |
| (Hexametaphosphoric acid, 10-15 residues) | Na-, Ca-salts |
| (Phytic acid) | Ca-salt |
| Sorbitol |  |
| Tartaric acid | Na-, K-salts |
| (Thiosulfuric acid) | Na-salt |

The water phase preferably has a heavy metal content of less than about 2 ppm.

Food, Drug and Cosmetic Products

The food, drug and cosmetic products of the present invention are prepared in emulsified form employing the highly unsaturated oils of the present invention to replace some or all of the oils used heretofore in such products. The oils used heretofore in such products have been, for the most part, either saturated or only slightly unsaturated (with 1 to 3 double bonds per molecule). These products normally contain various amounts of such prior art oils. Although it is technically possible to replace all of the previously used oils (or fats at room temperature) in such products with the highly unsaturated, and usually fishderived, oils, it appears to be more consumer oriented to only replace a portion of the traditionally used oils with the highly unsaturated oils. Thus, in food products in particular, it is preferably, for customer acceptance purposes, to only replace about 1 to 40, and preferably about 5 to 20% of the oils previously used in such products with the highly unsaturated oils.

The food grade emulsions are commonly differentiated between those which contain at least 80% oil or fat such as butter, mayonnaise, and margarines such as buttery margarine and those which contain less than 80% oil or fat such as spreads, salad dressing, and lite or dietetic mayonnaises.

When reformulating these prior products for the purposes of the present invention, therefore, which commonly use at least 80% by weight of a prior art oil phase and >0 to <20% by weight of a water phase therein, one may replace about 1 to 40, and preferably about 5 to 20% of such prior art oil phase with the highly unsaturated oils of the present invention. Further, when reformulating these prior art products according to the present invention which commonly use less than 80% by weight of a prior art oil phase and ≧20% of a water phase therein, one may replace about 1 to 60, and preferably about 10 to 30, % of such prior art oil phase with the highly unsaturated oils of the present invention.

The following Examples are merely illustrative of the scope of the present invention and are not intended as a limitation upon the full scope thereof.

EXAMPLE 1

This example discloses a general procedure for making a series of water-in-oil emulsion spreads wherein the oil phase contains 16% fish oil. This example is the untreated control to which the various treatments were compared.

Except for the presence or absence of the stabilizer components of the compositions of the present invention, the compositions of the spreads were the same. The stabilization of control additives used in such spreads are disclosed below in Examples 2-12.

The spreads were prepared based on the following basic formulation:

|  | % of Total Product | Weight (g) |
| --- | --- | --- |
| Oil Phase | | |
| Liquid Corn Oil | 36.00 | 36.00 |
| Partially Hydrogenated Corn Oil | 17.59 | 17.59 |
| Lecithin | 0.20 | 0.20 |
| Mono & Diglycerides | 0.20 | 0.20 |
| Margarine Flavor & Color | 0.01 | 0.01 |
| Fish Oil | 16.00 | 16.00 |
| Aqueous Phase | | |
| Deionized Water | 26.80 | 26.80 |
| Whey | 1.00 | 1.00 |
| Salt (NaCL) | 2.00 | 2.00 |
| Sodium Benzoate | 0.10 | 0.10 |
| Potassium Sorbate | 0.10 | 0.10 |
| Total | 100.00 | 100.00 |

The spread thus contained about 70% by weight of the oil phase and about 30% by weight of the aqueous or milk phase. The spread was prepared in an air environment. The fish oil was a non-winterized, refined menhaden oil containing 250 ppm citric acid for metal ion chelation. The oil was maintained under nitrogen and stored in a freezer until used. The stabilizing aqueous solutions, that replaced water in the aqueous phase, used in accordance with the present invention and as disclosed in more detail in Examples 2-12 below contained sugar (glucose, lactose, maltose, maltotroise, raffinose, sucrose, or trehalose), or sugar alcohol (sorbitol) and/or EDTA (ethylenediaminetetraacetic acid, tetrasodium salt).

The oil phase of the spreads, less fish oil, was heated to about 120° F. to liquefy it. The fish oil was briefly heated to 100° F. to liquefy it, and it was then immediately added to the oil phase and the composite oil phase was then mixed with the aqueous phase using an overhead stirrer with a 3-blade impeller at 250 RPM for approximately one minute. The resulting emulsion was transferred to a jacketed (−3° to −4° C. coolant in jacket) vessel of 6.4 cm inside diameter and solidified by mixing for about four minutes with an overhead stirrer at 200 RPM equipped with a U-shaped paddle of 6.0 cm diameter. The solidified emulsion was at about 49° F.

Twenty-six grams of the spread was transferred to a petri dish, swirled on the bench top to form a layer about 0.6 cm thick and 10 cm in diameter. The sample was stored at 4° C. for two hours to harden. The sample in the open petri dish was then stored fully exposed to air in a 25° C. incubator.

The spread was periodically tested until rancid, as indicated by a peroxide value (PV) of 15. The peroxide values were determined as described below by a micro-peroxide value method. The untreated control spread was rancid after 60 days at 25° C. exposed to air.

Micro-Peroxide Value Method for Oil Oxidation

The peroxide concentration in the samples was determined according to the spectrophotometric method of Swoboda and Lea (Chem. & Industry, 1958, Aug., pp. 1090-1091). A 3 ml aliquot of a glacial acetic acid:-chloroform solution (3:1 by volume) was mixed with a sample (20-400 mg, weighed directly into a test tube) in a septum-sealed, Hungate test tube (1.5×12 cm, capped septum tube from Bellco Glass Inc., Vineland, N.J.) by bubbling nitrogen through the solution for 5 minutes (nitrogen, washed through chloroform was bubbled into the oil using a long needle (22 gauge, 6 inch) placed through septum with a second one inch needle used as a vent). Two drops (0.08 ml) of freshly prepared iodide reagent (0.2 g potassium iodide dissolved in 1 ml of deionized water) was placed into the tube by briefly removing the cap. The tube was resealed and bubbled with nitrogen for 20 seconds. The vent and nitrogen needles were then removed. The sample was then mixed by shaking for 5 seconds and stored in the dark at 23° C.

After 1 hour, 7 ml of 0.5% aqueous cadmium acetate was added to the sample. The mixture was shaken for 15 seconds and centrifuged to separate the phases. The supernatant aqueous phase was measured spectrophotometrically at 350 nm to determine the peroxide concentration in the sample.

This spectrophotometric method was calibrated using oil of known peroxide value as determined by the official A.O.C.S. method, Cd 8-53.

EXAMPLE 2

This example illustrates the effectiveness of using a metal-ion chelator, such as EDTA, to retard oil oxidation. It is known to those skilled in the art that chelators will retard oxidation by preventing certain metal ions such as copper and iron from acting as a catalyst. The spread was made and tested as described in example 1 except the water in the aqueous phase was replaced by an EDTA solution composed of 0.0015 g EDTA and 26.7985 g deionized water.

The EDTA containing spread was rancid in 77 days at 25° C. exposed to air.

EXAMPLES 3-9

This series of spreads demonstrates stabilization due to sugars in the aqueous phase of the emulsion. The spreads were made and tested as described in example 1 except the water in the aqueous phase was replaced by a sugar solution composed of 4.32 g of a given sugar and 22.48 g of deionized water. As shown in Table 1, every sugar tested increased the stability of the spread compared to that of the untreated control, example 1. Table 1. Stabilization of fish oil spreads by sugars.

| Sugar in Spread | Time (days) Spread Rancid |
| --- | --- |
| Glucose | 68 |
| Lactose | 75 |
| Maltose | 63 |

-continued

| Sugar in Spread | Time (days) Spread Rancid |
|---|---|
| Maltotriose | 72 |
| Raffinose | 88 |
| Sucrose | 75 |
| Trehalose | 83 |

EXAMPLE 10

This example demonstrates stabilization due to a sugar alcohol in the aqueous phase of the spread. The spread was prepared and tested as described in example 1 except the water in the aqueous phase was replaced by a sorbitol solution consisting of 4.32 g sorbitol and 22.48 g of deionized water. The sorbitol containing spread was rancid at 78 days compared to 60 days for the untreated control spread.

EXAMPLES 11-12

This example demonstrates the synergistic effect of combining either a sugar or a sugar alcohol with a metal-ion chelator. The spreads were made and tested as described in example 1 except the water in the aqueous phase was replaced with a solution containing 0.0015 g EDTA, 22.4785 g deionized water, and 4.3200 g of glucose or sorbitol.

The glucose+EDTA spread was rancid in 87 days and the sorbitol+EDTA was rancid in 100 days. The stability of both spreads was greater than either the untreated control or spreads containing only one of the stabilizing components.

What is claimed is:

1. An aqueous food emulsion containing fish oil and a stabilizer therefor which comprises as the oil component of said emulsion at least one unsaturated compound selected from the group consisting of fatty acids and non-toxic derivatives thereof having at least three to six unsaturated carbon to carbon double bonds therein and, present in the water phase of said emulsion as a stabilizer adapted to prevent oxidative attack upon said double bonds, an amount of stabilizer effective to stabilize the fish oil against rancidity for at least 83 days, said stabilizer being selected from the group consisting of raffinose, trehalose, and sorbitol and a metal-ion chelator.

2. An emulsion as in claim 1 which is a water-in-oil emulsion.

3. An emulsion as in claim 1 which is an oil-in-water emulsion.

4. An emulsion as in claim 2 which is a spread containing less than 80% oil.

5. An emulsion as in claim 2 which is margarine.

6. An emulsion as in claim 2 which is butter.

7. An emulsion as in claim 3 which is mayonnaise.

8. An emulsion as in claim 3 which is salad dressing.

9. An emulsion as in claim 3 which is a spread containing less than 80% oil.

10. An emulsion as in claim 9 wherein the stabilizer is raffinose.

11. An emulsion as in claim 9 wherein the stabilizer is trehalose.

12. An emulsion as in claim 9 wherein the stabilizer is sorbitol and EDTA.

* * * * *